(12) United States Patent
Fan et al.

(10) Patent No.: US 6,646,026 B2
(45) Date of Patent: Nov. 11, 2003

(54) METHODS OF ENHANCING DYEABILITY OF POLYMERS

(75) Inventors: Qinguo Fan, North Dartmouth, MA (US); Yiqi Yang, Lincoln, NE (US); Samuel C. Ugbolue, New Bedford, MA (US); Alton R Wilson, North Dartmouth, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 10/068,911

(22) Filed: Feb. 7, 2002

(65) Prior Publication Data

US 2003/0158293 A1 Aug. 21, 2003

(51) Int. Cl.$^7$ .................................................. C08K 9/04
(52) U.S. Cl. ........................ 523/205; 523/200; 523/201; 523/216; 523/457; 523/466; 524/401; 524/430; 524/445; 524/447; 524/448; 524/450
(58) Field of Search ................................ 523/200, 201, 523/205, 216, 457, 466; 514/401, 430, 445, 447, 448, 450

(56) References Cited

U.S. PATENT DOCUMENTS

| | | | |
|---|---|---|---|
| 5,468,259 A | 11/1995 | Sheth et al. | .................... 8/497 |
| 5,550,192 A | 8/1996 | Sheth et al. | ................. 525/194 |
| 5,576,366 A | 11/1996 | Sheth | ......................... 524/140 |
| 5,985,999 A | 11/1999 | Dominguez et al. | .......... 525/74 |
| 6,054,215 A | 4/2000 | Son et al. | ..................... 428/364 |
| 6,126,701 A | 10/2000 | Calogero | ....................... 8/616 |
| 6,127,480 A | 10/2000 | Dominguez et al. | .......... 525/74 |
| 6,486,254 B1 * | 11/2002 | Barbee et al. | ............... 524/445 |

OTHER PUBLICATIONS

Akrman et al., "The Coloration of Polypropylene fibres with acid dyes", Journal of the Society of Dyers and Colourists, 111:p. 159–163 (1995).

Akrman et al., "Dyeing of polypropylene/wool blend in a single bath," Journal of the Society of Dyers and Colourists, 114: p. 209–215 (1998).

Baumann, "The Mechanism of Dyeing Polypropylene," American Dyestuff Reporter, p. 37–39 (Jul. 8, 1963).

Harlinger et al., "Innovative methods for the dyeing of polypropylene $2^{nd}$ Report: The influence of the dyestuff constitution and auxiliaries," Translation of Melliand Textilberichte, 73: p. 737–743, E340–E343, (1992).

Hasegawa et al., "Preparation and Mechnical Properties of Polypropylene– Clay Hybrids Using a Maleic Anhydride– Modified Polypropylene Oligomer," Journal of Applied Polymar Science, 67: p. 87–92 (1996).

Manias et al., "Polypropylene/Silicate Nanocomposites, Synthetic Routes and Materials Properties," Polymeric Materials: Science & Eng. 82: p. 282–283 (2000).

Manias et al., "Polypropylene/Montmorillonites Nanocomposites. Review of Synthetic Routes and Materials Properties," Chem. Mater., 13: p. 3518–3523 (2001).

Manias et al., "A Direct–Blending Approach for Polypropylene/Clay Nanocompostics Enhances Properites," MRS, Bulletin, 26, No. 11: p. 882–883 (2001.

Oya et al., "Factors controlling mechanical properties of clay mineral/polypropylene nanocomposites," Journal of Material Science, 35: p. 1045–1050 (2000).

Shah et al., "Dyeing of Modified Polypropylene–Cationic Dyes on Brominated Polypropylene," Textile Research Journal, vol. 54, p. 742–748 (1984).

* cited by examiner

Primary Examiner—Robert Dawson
Assistant Examiner—D. Aylward
(74) Attorney, Agent, or Firm—Fish & Richardson P.C.

(57) ABSTRACT

The invention relates to new methods of dyeing polymers. The methods include dispersing nanomaterials into the polymers to form polymer nanocomposites, and dyeing the polymer nanocomposites with a dye. The invention also relates to dyed polymers thus obtained and articles made from these dyed polymers.

9 Claims, 2 Drawing Sheets undyed

1% ow nanoPP11

2% ow nanoPP1

4% ow nanoPP1 undyed nanoPP3

2% ow nanoPP3

4% ow nanoPP3 undyed

1% ow nanoPP6

2% ow nanoPP6

4% ow nanoPP6 undyed nanoPP7

1% ow nanoPP7

2% ow nanoPP7

4% ow nanoPP7

METHODS OF ENHANCING DYEABILITY OF POLYMERS

TECHNICAL FIELD

This invention relates to methods of dyeing polymers, more specifically, methods of enhancing the dyeability of polymers.

BACKGROUND

Dyeing polymers such as polyolefins (e.g., polypropylene) has been a challenge to polymer and textile chemists for many decades. Currently available approaches rely mainly on copolymerization, polyblending, grafting, and plasma treatment technologies. Examples of such polymers include vinylpyridine/styrene copolymers; poly (ethylene/vinyl acetate) blended with polypropylene for disperse dyeability; stearyl methacrylate, dimethylaminopropylacrylamide, or basic imidized styrene-maleic anhydride copolymer for acid and disperse dyeability; stearyl methacrylate-maleic anhydride for basic and disperse dyeability; and organo-metal-complexes for specially selected dyes. See, e.g., Akrman et al, Journal of the Society of Dyers and Colourists, 114, 209–215 (1998); Luc et al., International Dyer, 32–36 (1998); and U.S. Pat. Nos. 6,127,480, 6,039,767, 5,985,999, 5,576,366, 5,550,192, and 5,468,259.

One disadvantage of these technologies is that the y considerably in crease the costs of the dyed products due to the cost increase of the process and materials. Another disadvantage is that some of these technologies are not suitable for producing fine fibers used in clothing materials.

SUMMARY

The invention is based on the discovery that the dyeability of polymers, such as polyolefins, can be significantly enhanced by incorporating into the polymers a nanomaterial such as a nanoclay, nanosilica, metal oxide (e.g., zinc oxide, silver oxide, calcium oxide, platinum oxide), zeolite, or nanoparticles of polymers (e.g., polysiloxanes). The term "dyeability" refers to a polymer's ability to be dyed, the r ate at which the polymer can be dyed, the amount of dye that can be applied to the polymer (i.e., dye exhaustion), and the fastness of the dyes on the dyed polymers.

Accordingly, the invention is related to methods of dyeing polymers by first dispersing a nanomaterial into the polymer to form a polymer nanocomposite, and then dyeing the polymer nanocomposite with a dye.

A "nanomaterial" refers to a particulate inorganic or organic compound or composition having a particle size in the range of 1–1,000 nm (e.g., 50–200 nm or 200–600 nm). Nanomaterials thus include nanoclay, nanosilica, metal oxides (e.g., zinc oxide, silver oxide, calcium oxide, or titanium oxide), zeolites, and nanoparticles of a polymer. Nanomaterials can be pretreated with ionic surfactants (e.g., alkyl ammonium salts or fluoro-organic compounds) for enhanced compatibility with the polymer (e.g., enhanced hydrophilicity, hydrophobicity, or amphiphilicity, depending on the hydrophilicity or hydrophobicity of the polymers), and subsequent improved (i.e., more even) dispersion, depending on the polymers.

The new methods are applicable to all polymers that need to be dyed including those polymers that may be difficult to dye using known techniques. Such polymers include polyvinyls (e.g., polystyrene), epoxy resins, polyolefins (e.g., polypropylene), polyamides (e.g., nylon 6), aromatic polyamide (e.g., aramid), polyimides (e.g., polypyromellitimide), polyanhydrides (e.g., polymaleic anhydride), acrylic polymers (e.g., polymethyl methacrylate), polyesters (e.g., poly (ethylene terephthalate)), polyimines (e.g., polyethyleneimine), polysaccharides (e.g. rayon), polypeptides (e.g., zein), polylactones (e.g., polycaprolatone), and their random or block copolymers. Useful polymers also include derivatives of polymers, e.g., polymers with ester derivatives on side acidic groups. The molecular weights of the polymers can be in the range of 15,000 to 150,000, and they can be amorphous or highly crystalline.

The methods are particularly suitable for polymers which are difficult to dye. Such polymers, which generally have no or very limited dyeability, include polyolefins, polyvinyls, aromatic polyamides, and epoxy resins.

Embodiments of the new methods include those in which the polymers are polyvinyls, epoxy resins, polyolefins, polyamides, aromatic polyamides, polyimides, polyanhydrides, acrylic polymers, polyesters, polyimines, polysaccharides, polypeptides, polylactones, or a random or block copolymers thereof; and those in which the weight ratio of the nanomaterial to the polymer is in the range of 0.01–20% (e.g., 0.1–10% or 0.5–5%).

The polymer nanocomposites thus obtained can be in the form of fibers, films, membranes, tubes, or particles.

The invention also relates to novel dyed polymer nanocomposites, each containing dye molecules, a polymer, and a nanomaterial dispersed in the polymer. The dyed polymer nanocomposites can be prepared by first obtaining polymer nanocomposites and then dyeing the polymer nanocomposites.

Also within the scope of the invention are articles made of the novel dyed polymer nanocomposites.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The new methods and dyed polymers provide numerous advantages. For example, the methods are relatively inexpensive and easy to carry out. In addition, the dyed polymers can be easily processed and have excellent mechanical strength, tensile strength, gas impermeability, flame retardance, and heat resistance. The dyeability of the resultant nanocomposites (e.g., dye exhaustion rate and colorfastness) can be engineered based on the selection of the nanomaterials and the modification of the process.

The details of several embodiments of the invention are set forth in the description below. Other features, objects, and advantages of the invention will be apparent from the description and drawings, and the accompanying claims.

BRIEF DESCRIPTION OF THE DRAWINGS

The file of this patent contains at least one drawing executed in color. Copies of this patent with color drawings wil be provided by the Patent and Trademark Office upon request and payment of the necessary fee.

DETAILED DESCRIPTION

Figure 1:
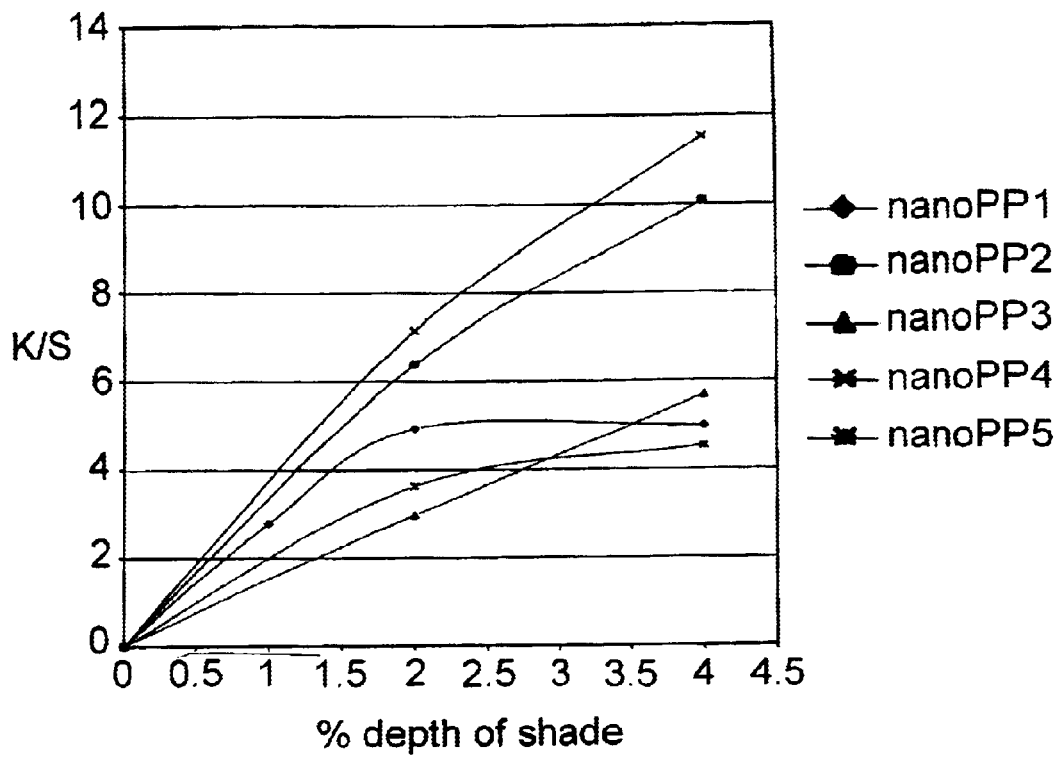
FIG. 1 is a graph showing build-up curves of an acid dye in polypropylene nanocomposites.

The present invention provides methods of enhancing the dyeability of a wide variety of polymers, such as polyvinyls (e.g., polystyrene), epoxy resins, polyolefins (e.g., polypropylene), polyamides (e.g., nylon 6), aromatic polyamide (e.g., aramid), polyimides (e.g., polypyromellitimide), polyanhydrides (e.g., polymaleic anhydride), acrylic polymers (e.g., polymethyl methacrylate), polyesters (e.g., poly (ethylene terephthalate)), polyimines (e.g., polyethyleneimine), polysaccharides (e.g. rayon), polypeptides (e.g., zein), polylactones (e.g., polycaprolatone), and their random or block copolymers. The methods include forming nanocomposites of these polymers by using a nanomaterial, e.g., nanoclay (which contains montmorillonite (MMT) $Al_2Si_4O_{10}(OH)_2$), nanosilica, metal oxide, zeolite, or nanoparticles of polymers such as polysiloxanes.

Preparation of Polymer Nanocomposites

The methods include first selecting a suitable nanomaterial which is optionally treated with a surfactant (e.g., an anionic or cationic surfactant such as an alkyl ammonium salt) to modify its surface. After the surface modification, the nanomaterial can become hydrophilic, hydrophobic, or amphiphilic, thereby enhancing the accessibility of dye molecules to the polymer nanocomposite. A polymer (e.g., a polyolefin), optionally dispersed (e.g., intercalated, or exfoliated) with a certain amount of the nanomaterial is then heated to melt, or is dissolved in an organic solvent, which is optionally heated. The nanomaterial is then dispersed into the molten polymer or the polymer solution, giving a polymer nanocomposite. Even dispersion of the nanomaterial in the polymer or polymer solution can be achieved by methods known in the art, e.g., by continuous stirring, ultrasonication, and/or compounding (e.g., extrusion), optionally with the aid of additional surfactants.

The dispersion of the nanomaterials within the polymers creates dye sites for dyeing the polymers. Prior to the dispersion, other components (e.g., fillers, which are water insoluble solids) can also be added into the melted polymers or polymer solutions. The other components can be added directly (i.e., as solids) to the melted polymers or the polymer solutions. These other components can also be added as solutions in organic solvents. Additional examples of the other components include plasticizers, different types of polymers, or other agents as needed.

The dispersion of the nanomaterials in the polymers can be controlled, e.g., by changing the duration, pulse, and amplitude of the ultrasonication, the crystallinity of the polymer, or the compatibility of the nanomaterial and polymer. For instance, better dispersion (e.g., more even distribution of the nanomaterials in the polymers) can be achieved by increasing the duration or amplitude of the pulse of the ultrasonication. Under the same conditions, nanomaterials can be better dispersed into polymers that are more crystalline. Better dispersion can also be achieved in nanocomposites that contain nanomaterials and polymers that are more compatible (e.g., hydrophilic nanomaterials and hydrophilic polymers) than in nanocomposites that contain less compatible nanomaterials and polymers (e.g., hydrophilic nanomaterials and hydrophobic polymers).

After the dispersion, the melted polymers or the polymer solutions can be allowed to solidify for storage or further processing. They can also be directly processed into a desired form, e.g., film, fibers, particles, or cylinders, using standard techniques.

The polymer nanocomposites thus obtained can be characterized by methods known in the art. For instance, their thermal properties can be determined by using Differential Scanning Calorimetry (DSC). An injection molder can be used for mechanical testing and for measuring the nanocomposites' dynamic moduli. See, e.g., Hasegawa et al., J. Applied Poly. Sci., 67, 87–92, 1998. The dispersity of the nanomaterial in the polymer can be evaluated by using wide-angle X-Ray Diffraction (XRD) and Transmission Electron Microscopy (TEM). See, e.g., Manias et al., Polymeric Materials, Science & Engineering, 82, 282–283, 2000. Optical microscopy studies can reveal how the polymer nanocomposites are dyed. Tests of the tensile strength of the polymer nanocomposites can be carried out with an Instron tensile tester.

Because of their mechanical strength, the polymer nanocomposites can be used as bulk materials, e.g., for packaging. They can also be made into fibers that can be used to manufacture woven or non-woven fabrics.

Dyeing the Polymer Nanocomposites

The polymer nanocomposites obtained as described above can be dyed using conventional methods. For instance, they may be dyed in a dye bath using conventional ionic dyes (i.e., acid or basic dyes) and disperse dyeing techniques.

Acid dyes (one type of anionic dyes) contain acidic groups, such as —$SO_3H$, and are used with polymer nanocomposites containing basic groups that can interact with these acidic groups. The most common structural types of acid dyes are monoazo and anthraquinone dyes. Examples of acid dyes include C.I. (Color Index) Acid Red 138, C.I. Acid Red 266, and C.I. Acid Blue 45. Structures of these three dyes are shown below:

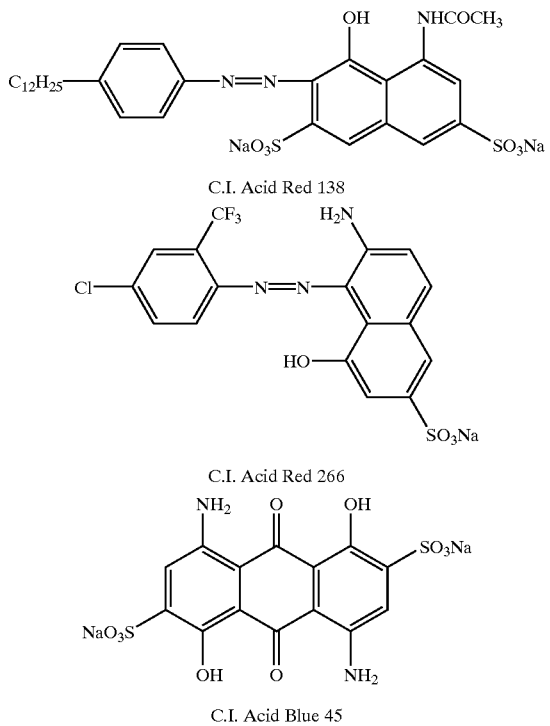

C.I. Acid Red 138

C.I. Acid Red 266

C.I. Acid Blue 45

Basic dyes (also called cationic dyes) can be used for dyeing polymer nanocomposites that carry anionic groups. Examples of basic dyes include C.I. Basic Blue 3 and C.I. Basic Green 4, with structures shown below:

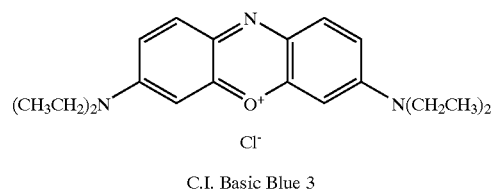

C.I. Basic Blue 3

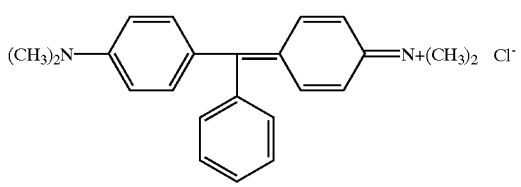

C.I. Basic Green 4

Disperse dyes are nonionic and almost insoluble in water. They are used as finely distributed aqueous dispersions. Like acid dyes, the two most common types of disperse dyes are also monoazo and anthraquinone dyes. Examples of disperse dyes include C.I. Disperse Blue 183 and C.I. Disperse Blue 73, with their structures shown below:

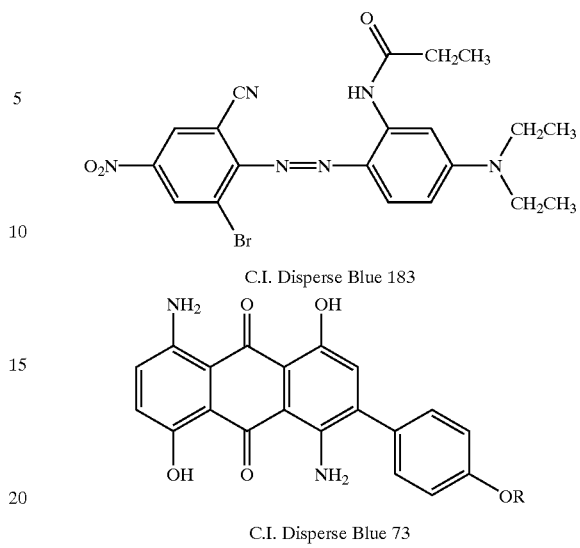

C.I. Disperse Blue 183

C.I. Disperse Blue 73

Additional ionic (i.e., acid and basic) and disperse dyes useful in the new methods are listed in "Dyes and Pigments by Color Index and Generic Names" in Textile Chemist and Colorist, 24 (7), 1992.

Generally, the dye is used in the form of a dye solution so that it can be readily applied by dipping the polymer nanocomposites into a container with the dye solution, by spraying the dye solution onto the polymer nanocomposites, or by using a cascading roll technique. The dye solution can also be in the form of a print paste, which is typically used in roller printing or screen printing, particularly on fabrics made from the polymer nanocomposites. The polymer nanocomposites can be dyed multiple times using one or more dyeing techniques.

Aqueous dye baths typically have a pH value in the range from about 2 to about 11, e.g., from about 2.5 to about 6.5 for acid dyes, from about 8.5 to about 10.5 for reactive dyes, and from about 4.5 to about 6.5 for disperse dyes and basic dyes. The pH may be adjusted, if desired, using a variety of compounds, such as formic acid, acetic acid, sulfamic acid, citric acid, phosphoric acid, nitric acid, sulfuric acid, monosodium phosphate, trisodium phosphate, sodium carbonate, sodium bicarbonate, ammonium hydroxide, sodium hydroxide, or a combination thereof. A surfactant, typically a nonionic surfactant, can also be used to aid in dispersing sparingly water-soluble disperse dyes in a dye bath. During the dyeing step, the dye bath is agitated to hasten the dyeing rate. The dyeing step can be carried out at a variety of temperatures, with higher temperatures generally promoting the rate of dyeing.

The polymer nanocomposites can also be dyed by jet dyeing (see *Engineering in Textile Coloration* edited by C. Duckworth, p. 56, Dyers Company Publications Trust, 1983), which permits high-temperature dyeing and impingement of the dye onto moving polymer nanocomposites (typically in the form of fabrics) through use of a venturi jet system. Dye carriers permit faster dyeing of the polymer nanocomposites, e.g., at atmospheric pressure and below 100° C. Such dye carriers are typically organic compounds that can be emulsified in water. Representative examples of such carriers include aromatic hydrocarbons such as diphenyl and methylnaphthalene, phenols such as phenylphenol, chlorinated hydrocarbons such as dichloro- and trichlorobenzene, and aromatic esters such as methyl salicylate, butyl benzoate, diethylphthalate, and benzaldehyde. These carriers usually can be removed from the dyed materials after dyeing. Dye carriers increase the rate of dyeing by affecting both the polymer and the dye bath. The absorption of typical carrier substances alters the viscoelastic properties of the polymer nanocomposite in a manner consistent with the view that carrier activity is associated with an increase in polymer segmental mobility, at least in the more accessible region of the polymer chain molecules. In addition to the use of carriers in promoting the build-up of dyeing at the boil, small amounts of carriers may be added in high-temperature dyeing processes to promote the leveling of the more difficult disperse dyes.

During dyeing, the dyes are first adsorbed onto the surface of the polymer nanocomposites, and subsequently attracted to the dye sites created by the dispersion of the nanomaterials. Ultimately, the dye molecules attach themselves to the nanocomposites, thereby enhancing the dyeability of the polymer nanocomposite. In some applications (e.g., thermosol dyeing), dry heat may be applied to the polymer nanocomposites (after they are removed from the dye baths) at a wide range of elevated temperature to cause the dye to penetrate into, and become fixed in, the polymer nanocomposites. The dye fixation step involves exposing the dyed polymer nanocomposites to high temperature, wet or dry, e.g., in an oven. The temperature can vary up to 20 or 25° C. below the melting temperatures of the polymer nanocomposites. Generally, higher drying temperatures result in shorter drying times. Typically, the heating time is from about 1 minute to about 10 minutes. Residual dyes may then be removed from the polymer nanocomposites, e.g., by rinsing with water or a reduction-clearing bath.

Characterization of the Dyed Polymer Nanocomposites

A dyed polymer nanocomposite can be characterized, e.g., by measuring the affinity between the dye and the polymer. The dyeability can also be evaluated by determining the percentage exhaustion of the dye in a dye bath, e.g., by measuring the absorbance of the dye bath at the beginning and after dyeing, by using a spectrophotometer.

The fastness against light, washing, rubbing, shampooing, and dry cleaning of the novel dyed polymer nanocomposites can be evaluated according to ISO procedures (e.g., ISO-B02:1994, ISO 105-C01:1989, ISO 105-X12:1992, ISO document 473, and ISO 105-D01:1993, respectively).

The efficiency of dyeing (i.e., dyeability) depends on the type of dye and polymer, the size and structure of the nanomaterial, and the weight ratio of the nanomaterial to the polymer. A higher efficiency of dyeing can be achieved by adding a higher amount of the nanomaterial into the polymers when the other factors (i.e., the types of the dye and the polymer, and the size and structure of the nanomaterial) are the same. In general, the higher the compatibility between the nanomaterial and the polymer, or the lower the crystallinity of the polymer, the higher the dyeability of the polymer nanocomposite.

On the other hand, more even dyeing (improved color yield) can be achieved in nanocomposites in which the nanomaterials are more evenly distributed within the polymers. It can also be achieved when a dye of smaller size is used.

Uses of the Dyeable Polymer Nanocomposites

The new dyeable polymer nanocomposites have improved mechanical properties and tensile strength, and low permeability. Further, when the amount of a nanomaterial is within a certain range (e.g., less than 5%), the polymer nanocomposites are also easy to process. Thus, these new dyeable polymer nanocomposites can be widely used for making fibers, fabrics, films, plates, sheets, and bulk materials such as toys, utensils, appliances, furniture, and plastic tools as well as packaging materials.

The invention is further described in the following examples, which are only illustrative and do not in any way limit the scope of the invention described in the claims.

EXAMPLES

Example 1

Preparation of Polypropylene Nanocomposites with Nanoclays by Ultrasonication

Isotactic polypropylene chips (Philips Sumika Polypropylene Company, Houston, Tex.), xylene (J. T Baker Company, Philipsburg, N.J.), and a nanoclay (Cloisite 15A, Southern Clay Company, Gonzales, Tex.) were mixed in a stainless steel container. The nanoclay contains a natural montmorillonite (MMT) modified with a quaternary ammonium salt having a structure shown below:

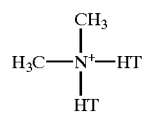

wherein HT in the formula specifies hydrogenated tallow of $C_{18}$ (approx. 65%), $C_{16}$ (approx. 30%) and $C_{14}$ (approx. of 5%).

Other specifications for Cloisite 15A, as provided by the manufacturer, are shown in Table 1.

TABLE 1

| Physical properties of Cloisite 15A | | | | |
|---|---|---|---|---|
| | | Particle Size | | Density, |
| Color | Less than 10% | Less than 50% | Less than 90% | g/cc |
| Off White | 2µ | 6µ | 13µ | 1.66 |

The container was placed in a sand bath insulated by glass-fiber fabrics. A thermocouple probe was tucked in the sand bath to check the temperature. The transducer of an ultrasonic homogenizer (750 W) was immersed in the stainless steel container.

This system was heated on a hot plate and the temperature was gradually increased to the boiling point of xylene (130–140° C.) at which the polypropylene started to dissolve.

The ultrasonic homogenizer was started for a set period of time. The pulsation rate (i.e., the time for which the ultrasonic is ON and OFF) and the amplitude of the ultrasonic waves were pre-set before the start of ultrasonic action as indicated in Table 2 below. The temperature was maintained in the range of 130–140° C. during the sonication time. In some cases, a controlled amount of xylene was added during the homogenization process to prevent the nanocomposite from solidifying. After this homogenization process, the ultrasonic device was switched off and the transducer was removed. The remaining xylene was allowed to evaporate at its boiling temperature until the polymer nanocomposite solidified.

Table 2 shows the detailed specifications of the nanocomposites (owp stands for on weight (or by weight) of polypropylene):

TABLE 2

Composition of nanoclay polypropylene (PP) nanocomposites

| Sample ID | Nanoclay (g), % owp | Xylene (g), % owp | Weight of PP (g) | Ultrasonic time (min) | Pulse (s) | Amplitude (%) |
|---|---|---|---|---|---|---|
| PP0 | — | 40 g, 500% | 8 g | 20 | 3on 5off | 50% |
| nanoPP1 | 0.4 g, 5% | 40 g, 500% | 8 g | 7 | 3on 5off | 50% |
| nanoPP2 | 0.6 g, 20% | 60 g, 2000% | 3 g | 15 | 3on 3off | 70% |
| nanoPP3 | 0.3 g, 2% | 50 g, 500% | 15 g | 30 | 3on 3off | 70% |
| nanoPP4 | 0.75 g, 5% | 50 g, 500% | 15 g | 30 | 3on 3off | 70% |
| nanoPP5 | 0.75 g, 5% | 30 g, 200% | 15 g | 30 | continuous | 70% |
| nanoPP6 | 1.50, 10% | 75 g, 500% | 15 g | 15 | 3on 3off | 70% |

Example 2

Dyeing the Nanoclay Polypropylene Nanocomposites

The nanoclay polypropylene nanocomposites prepared in Example 1 were molded into films by using a hot laboratory press, which was heated to the melting point of the nanoclay polypropylene nanocomposites (i.e., 170° C.), to obtain very fine, thin layers of the polypropylene nanocomposites.

The nanoclay polypropylene nanocomposite films thus obtained were dyed in an aqueous dye bath containing an acid dye C.I. Acid Red 266, or an aqueous dye bath containing a disperse dye C.I. Disperse Red 65.

Acid Dyeing

Aqueous dye baths containing 1, 2, and 4% by weight of C.I. Acid Red 266 (i.e., 1, 2, and 4% depth of shade) were first prepared. The pH of the dye bath was 3.5. For even dyeing, the dye bath also contained an anionic leveling agent, Orco Nyasol Leveler AA-50, at a concentration of 10 g/l.

Into each of these dye baths was added a polypropylene nanocomposite film described above at a weight ratio of 1:20 (polymer nanocomposite: dye bath). The dyeing process was conducted in Ahiba Polymat Laboratory dyeing machine.

The dye bath was heated in a sealed stainless steel dyeing with a temperature increase from 30° C. to 100° C. at a rate of 2° C./minute. The temperature was then kept constant for 60 minutes. Finally the dye bath was cooled to 40° C. The samples were extracted and washed with cold running water for 5 minutes.

Disperse Dyeing

Aqueous dye baths containing 1, 2, and 4% (by weight) of C.I. Disperse Red 65 were prepared. The dye baths had pH values that were weakly acidic. The dye baths further contained, as auxiliaries, 80% acetic acid at a concentration of 1 g/l, Irgasol DAM (a dispersing agent) at a concentration of 2 g/l, and Albatex FFC (a leveling agent) also at a concentration of 2 g/l.

The polypropylene nanocomposite films were placed into the dye baths, also at a weight ratio of 1:20. The dyeing process was conducted in an Ahiba Polymat Laboratory dyeing machine.

Dyeing was performed by raising the dye bath temperature from 40 to 130° C. at 1.5° C./minute, holding at this temperature for 45 minutes, and cooling to 60° C. at 3° C./minute. The dyed polymer nanocomposite films were rinsed in running water for 5 minutes with hand agitation. Reduction clearing was done by placing the dyed films for 10 minutes at 60–70° C. in a solution containing 6 ml/l 30% caustic soda and 4 g/l hydrosulfite at a weight ratio of approximately 1:40 (dyed polymer nanocomposite: solution). The samples were then rinsed for at least 5 minutes with cold (15–25° C.) running water. Finally, the dyed polypropylene composite films were neutralized with 1.2 ml/l 99.9% acetic acid for 2 minutes and then rinsed with cold (15–25° C.) running water for at least 5 minutes.

Examples 3

Preparation of Silica Polypropylene Nanocomposites

An organo silica dispersed in methyl ethyl ketone (MEK) (Nissan Chemical Industries, Ltd., Tarrytown, N.J.) was used to prepare a silica polypropylene nanocomposite following the procedure described in Example 1. Specifications of the silica and the composition of the silica polypropylene nanocomposite are listed below in Tables 3 and 4, respectively:

TABLE 3

Physical properties of silica

| Dispersant | $SiO_2$ (wt %) | Water (wt %) | Particle size (nm) | S. Grav. | Viscosity (mPa.s) |
|---|---|---|---|---|---|
| MEK | 30 | <0.6 | 10–20 | 0.98 | <5 |

TABLE 4

Composition of PP nanocomposites

| Sample | weight of os (g), % owp | xylene (g), % owp | weight of PP (g) | Ultrasonic time (min) | Pulse (s) | Amplitude (%) |
|---|---|---|---|---|---|---|
| nanoPP6 | 1.50, 10% oc | 75 g, 500% | 15 g | 15 | 3on 3off | 70% |
| nanoPP7 | 2.5, 5% oc | 250 g, 500% | 50 g | 30 | 3on 3off | 70% |

(owp = on weight (or by weight) of polypropylene; os = organo silica-MEK)

Example 4

Dyeing of Silica Polypropylene Nanocomposite

The silica polypropylene nanocomposite obtained from Example 3 was molded into film by using a hot laboratory press heated to 185° C. A square template was placed between the jaws of the press. For an even thickness, the films were removed when the temperature of the press cooled down to 80° C.

The silica polypropylene nanocomposite films thus obtained were dyed in an aqueous dye bath containing an acid dye C.I. Mordant Black 17, or an aqueous dye bath containing a disperse dye C.I. Disperse Blue 102. The acid dye bath and the disperse dye bath were of the same compositions and concentration as those described in Example 2, except that the dyes were different.

Example 5

Dyeing of Polypropylene Films

For comparison, films of virgin polypropylene (i.e., propylene without any modifications) were prepared and dyed according to the procedures described in Example 1 and Example 2.

Example 6

Washfastness Test

Color fastness is the resistance of the color of textiles to the different agents and environments to which these materials may be exposed during manufacture and their subsequent applications. The dyed polypropylene nanocomposite films obtained in Examples 2 and 4, and the dyed polypropylene films obtained in Example 5, were tested for their fastness against washing by the following procedure:

A wash solution was first prepared by dissolving 4 g of AATCC (the American Association of Textile Chemists and Colorists) standard detergent WOB in 1 liter of distilled water. The dyed film samples were then put into the test container and 50 ml of the above washing solution was added. After the lid of the container was secured, the Launder-ometer (Atlas Electric Devices, Co., Chicago, Ill.) was allowed to run for 30 minutes at 60° C. Upon completion, the dyed film samples were rinsed twice for 1 minute in water at 40° C. The rinsed samples were subject to visual, spectral, and microscopic (SEM) analysis.

The results show that dispersion of a nanomaterial into the polypropylene increased its dyeability as compared to the virgin polypropylene, which was not dyeable with an acid dye and was only dyed to a very low extent with a disperse dye. Varying the quantity of nanomaterials in the nanocomposites had a noticeable effect on the exhaustion of the dye.

The results further show that nanocomposites containing higher amounts of nanomaterials are dyed more evenly than those containing lower amounts of nanomaterials. For instance, nanoPP1, nanoPP4, and nanoPP5 (all of which were prepared with 5% add-on of nanoclay) had improved color yield (i.e., more even dyeing) as compared to nanoPP3 (which was prepared with 2% add-on of nanoclay). The comparison of K/S (Kubelka-Munk coefficient) values at 2% depth-of shade indicates that nanoPP1 (5% nanoclay add-on) had a slightly better color yield than nanoPP3 (2% nanoclay add-on) when they were dyed with a disperse dye bath at 4% depth of shade. NanoPP2 (20% nanoclay add-on) dyed with acid and disperse dye baths also showed much more even dyeing than nanoPP3 and nanoPP4 (2% and 5% nanoclay add-ons, respectively).

A longer duration of ultrasonication also results in a more even dye distribution. In the case of acid dyeing, a comparison between dyed nanoPP1 (7 minutes) and dyed nanoPP4 (30 minutes) showed that the dye had exhausted more on dyed nanoPP4 than nanoPP1.

Figure 2:
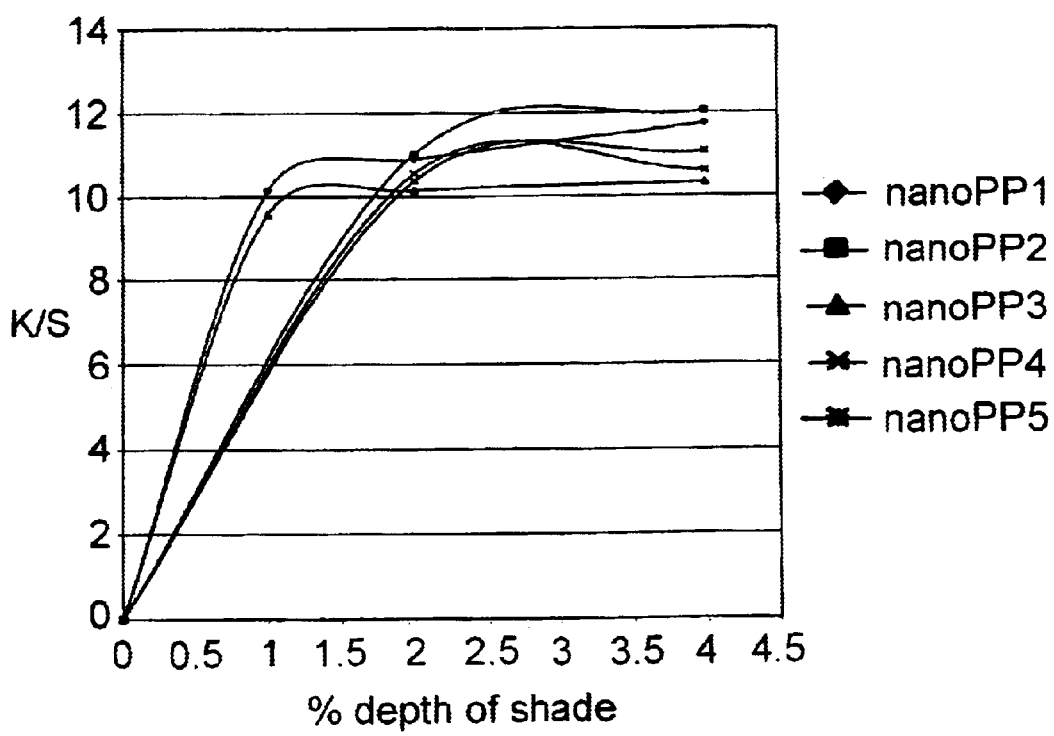
FIG. 2 is a graph showing build-up curves of a disperse dye in polypropylene nanocomposites.
Figure 3A:
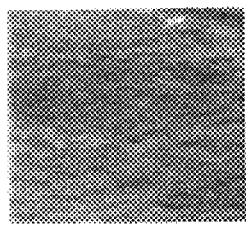
FIGS. 3A to 3D are illustrations of a polypropylene nanocomposite (nanoPP1) dyed in different dye bath concentrations, each containing an acid dye. The amount of dye build-up in the composite increased with an increase of the depth of shade in the dye bath.
Figure 3B:
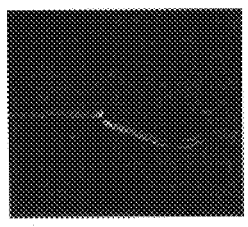
Figure 3C:
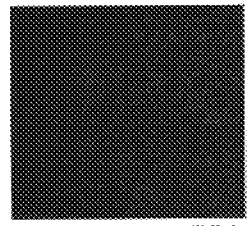
Figure 3D:
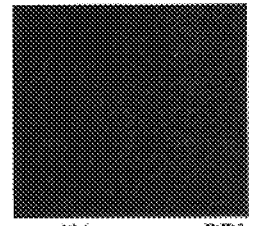
Figure 4A:
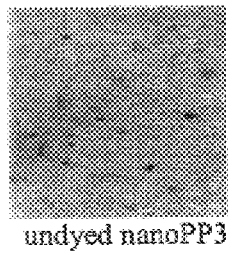
FIGS. 4A to 4C are illustrations showing another polypropylene nanocomposite (nanoPP3) dyed in different dye bath concentrations, each containing a disperse dye. The amount of dye build-up increased with an increase of the depth of shade in the dye bath.
Figure 4B:
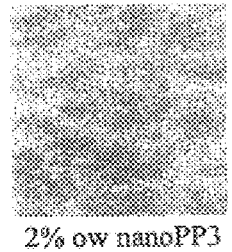
Figure 4C:
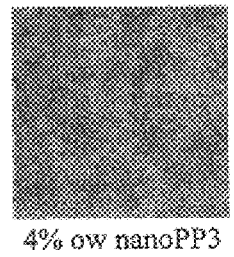
Figure 5A:
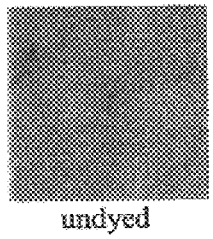
FIGS. 5A to 5D are illustrations showing another polypropylene nanocomposite (nanoPP6) dyed in different dye bath concentrations, each containing a disperse dye. The amount of dye build-up increased with an increase of the depth of shade in the dye bath.
Figure 5B:
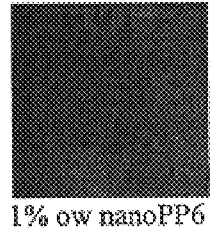
Figure 5C:
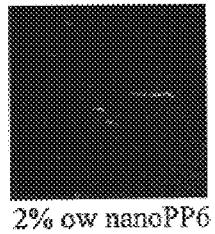
Figure 5D:
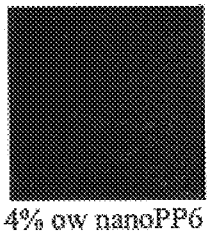
Figure 6A:
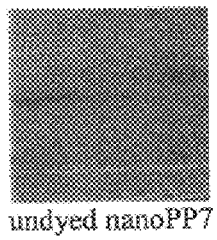
FIGS. 6A to 6D are illustrations showing another polypropylene nanocomposite (nanoPP7) dyed in different dye bath concentrations, each containing a disperse dye. The amount of dye build-up increased with an increase of the depth of shade in the dye bath.
Figure 6B:
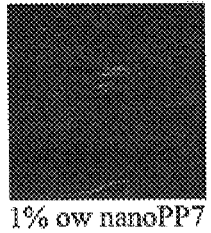
Figure 6C:
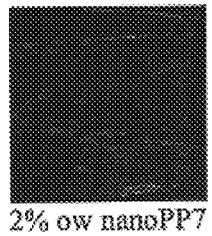
Figure 6D:
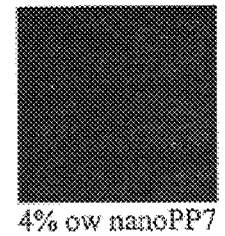

The nature of the build-up curves, among other factors, was influenced by the chemical structure of the dye and the available dye sites in the nanocomposites. The build-up curves were also affected by the depth of shade (i.e., dye concentration) in the dye bath. As shown in FIG. 1 and FIG. 2, there is an increase in the color yield from 1 to 4% depth of shade except for nanoPP1 and nanoPP5 where the curve is almost flat from 2 to 4% depth. This, however, may be related to the unavailability of dye sites (nanoclay) in proportion to the amount of dye in the dyebath. This effect was observed in all the nanocomposite samples that were disperse dyed. In other words, the disperse dye on polypropylene nanocomposites reaches saturation at higher dye concentration. However, high color yield on disperse dyed samples was observed with increased concentration of dyes without a noticeable difference between the dyed nanocomposites with varying amount of nanoclay.

The results also indicate that dye exhaustion increased with the increase of depths of shades of dye baths. As shown in FIGS. 3A–3D, 4A–4C, 5A–5D, and 6A–6D, the dye exhaustion increased with the increase of the depths of shades in dye baths, i.e., 1% to 4%, in all the tested nanocomposites.

Example 7

Lightfastness Test

The fabrics and polypropylene nanocomposite films are cut into the dimension of 70×120 mm. The specimens are then stapled on the white card and one part of the sample is exposed (55×25 mm) which is called the 20-hour sample. The white cards with the samples are mounted on the frames. The fading apparatus is arranged by clamping one full (cored) and another half (solid) carbon electrodes and enclosing them in a glass bulb. A Fade-ometer (Atlas Electric Devices, Co., Chicago, Ill.) is set to the operating conditions specified in the AATCC Test Method 16-Option A. The specimen rack is filled with the framed white cards and the required black thermometer unit. A thermostat is used to maintain the chamber temperature to the test specifications (63° C.). The chamber drum is filled with water to maintain the required value of humidity (30%). The timer is adjusted and the machine is run for 20 hours after which it stops automatically. The frames (with samples) are removed and the exposed area is compared with the unexposed part of the sample. The samples are evaluated according the AATCC Gray Scale Rating.

Example 8

Dyeing Nanocomposites of Polyacrynitrile

Nanocomposites of polyacrylnitrile are prepared and dyed according to the procedures described in Examples 1 and 2, except that N,N-dimethylformamide (DMF) is used, instead of xylene.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of dyeing a polymer, the method comprising dispersing a nanomaterial into the polymer to form a polymer nanocomposite, and dyeing the polymer nanocomposite with a dye.

2. The method of claim 1, wherein the polymer is a polyvinyl, epoxy resin, polyolefin, polyamide, aroma tic polyamide, polyimide, polyanhydride, acrylic polymer, polyester, polyimine, polysaccharide, polypeptide, polylactone, or a random or block copolymer thereof.

3. The method of claim 1, wherein the polymer is a polyolefin.

4. The method of claim 3, wherein the polyolefin is polypropylene.

5. The method of claim 1, wherein the nanomaterial is nanoclay, nanosilica, metal oxide, zeolite, or nanoparticles of a polymer.

6. The method of claim 1, wherein a nanomaterial is pretreated with a surfactant for improved compatibility with the polymer.

7. The method of claim 1, wherein a weight ratio of the nanomaterial to the polymer is in the range of 0.01–20%.

8. The method of claim 1, wherein the weight ratio of the nanomaterial to the polymer is in the range of 0.5–5%.

9. The method of claim 1, wherein the nanomaterial is intercalated or exfoliated in the polymer.

* * * * *